(12) United States Patent
Kearney

(10) Patent No.: US 7,676,323 B2
(45) Date of Patent: Mar. 9, 2010

(54) SIGNAL PROCESSING METHOD FOR AN ENGINE KNOCK SIGNAL

(75) Inventor: Matthew J. Kearney, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 471 days.

(21) Appl. No.: 11/801,026

(22) Filed: May 8, 2007

(65) Prior Publication Data

US 2008/0276688 A1 Nov. 13, 2008

(51) Int. Cl.
*G06F 19/00* (2006.01)
*G01L 23/22* (2006.01)

(52) U.S. Cl. ..................... 701/111; 73/35.04

(58) Field of Classification Search ............ 123/406.29, 123/406.34–406.39, 435, 436; 701/101, 701/102, 103, 111, 114, 115; 73/35.01–35.04, 73/114.07, 114.16
See application file for complete search history.

(56) References Cited

U.S. PATENT DOCUMENTS

| | | | | |
|---|---|---|---|---|
| 4,478,068 A | * | 10/1984 | Bonitz et al. ................. | 701/111 |
| 5,052,214 A | * | 10/1991 | Dils ............................ | 701/111 |
| 5,099,681 A | * | 3/1992 | Dils ............................ | 73/35.07 |
| 5,373,448 A | * | 12/1994 | Katogi et al. ................ | 701/111 |
| 6,246,952 B1 | * | 6/2001 | Honda ......................... | 701/111 |
| 6,456,927 B1 | * | 9/2002 | Frankowski et al. ......... | 701/111 |
| 6,688,286 B2 | * | 2/2004 | Kokubo et al. .......... | 123/406.33 |
| 6,845,312 B1 | * | 1/2005 | Cross et al. .................. | 701/111 |
| 7,181,339 B2 | * | 2/2007 | Remelman ................... | 701/111 |
| 7,310,575 B2 | * | 12/2007 | Honda ......................... | 701/111 |
| 7,526,943 B2 | * | 5/2009 | Cubr et al. .................. | 73/35.09 |

FOREIGN PATENT DOCUMENTS

| | | | | | |
|---|---|---|---|---|---|
| JP | 05288114 A | * | 11/1993 | ............ | 123/406.37 |
| JP | 2005188297 A | * | 7/2005 | ............ | 123/406.33 |

* cited by examiner

*Primary Examiner*—Willis R Wolfe, Jr.
(74) *Attorney, Agent, or Firm*—Jimmy L. Funke

(57) ABSTRACT

The duration of a knock detection window over which a filtered knock signal is single-point DFT-processed for engine knock detection is user adjustable. The knock detection window is defined by at least two overlapping identical duration sub-windows, and the extent of the sub-window overlap is changed to adjust the duration of the knock detection window. The DFT processing is performed over each sub-window and the processing results are combined for knock detection.

4 Claims, 2 Drawing Sheets

SIGNAL PROCESSING METHOD FOR AN ENGINE KNOCK SIGNAL

TECHNICAL FIELD

The present invention relates to knock detection in an internal combustion engine, and more particularly to a method of processing a signal produced by a knock sensor.

BACKGROUND OF THE INVENTION

The occurrence of knocking in a multi-cylinder internal combustion engine can be detected by mounting at least one piezoelectric knock sensor on the engine to produce an electrical knock signal responsive to engine vibration, and suitably filtering and processing the knock signal. Since knocking in a given cylinder occurs primarily in a certain interval following the top dead center position of the combustion stroke, the filtered knock signal can be processed over specified knock detection windows corresponding to the various cylinders. When a knock event is detected for a given engine cylinder, the spark timing and/or fuel delivery for that cylinder are altered to suppress further knocking.

The signal processing portion of knock control generally involves analyzing the filtered knock signal to determine the amplitude of the signal at one or more specified knock frequencies. The specified knock frequency depends on the engine geometry and other factors such as the combustion temperature, and is typically determined off-line for a particular class of engines. In general, a knock event is detected if the signal amplitude at a specified knock frequency exceeds a calibrated threshold.

A common way of determining the knock signal amplitude at a specified knock frequency is to transform the filtered knock signal to the frequency domain over the knock detection window using Discrete Fourier Transform (DFT) equations. In principle, the DFT calculations can be performed in real time by an on-board microprocessor or digital signal processor (DSP). But in a production system, cost-driven limitations on the processing throughput and memory capacity can result in constraints that tend to limit the applicability and usefulness of the DFT. The usual way of addressing this problem is to limit the duration of the knock detection window to a single value in order to simplify the DFT calculations. However, fixing the duration of the knock detection window can make it difficult to calibrate the system for optimal knock detection, particularly when other sources of vibrational noise occur. Accordingly, what is needed is a technique for permitting adjustment of the knock detection window duration without significantly increasing the computational burden or memory capacity required to perform the DFT calculations.

SUMMARY OF THE INVENTION

The present invention provides an improved method of providing an adjustable duration knock detection window over which a filtered knock signal is DFT-processed at a single point for engine knock detection. The knock detection window is defined by at least two overlapping identical duration sub-windows, where the extent of the sub-window overlap is adjustable to vary the duration of the knock detection window. The DFT processing is performed over each sub-window using the same tables of pre-calculated DFT parameters, and the processing results are combined for knock detection.

DESCRIPTION OF THE PREFERRED EMBODIMENT

Figure 1:
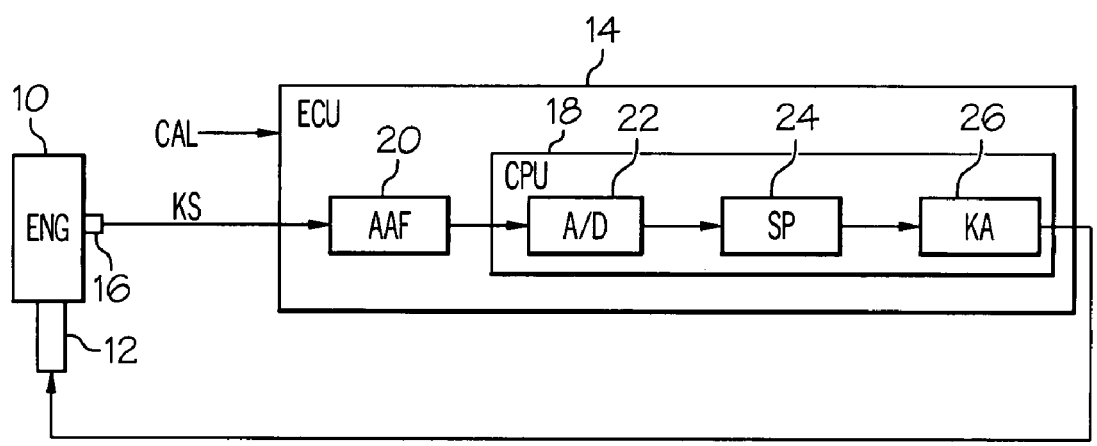
FIG. 1 is a block diagram of an engine, a knock sensor and an engine control unit (ECU) including a central processing unit (CPU) for carrying out the signal processing method of this invention.

Referring to FIG. 1, the reference numeral 10 generally designates a multi-cylinder internal combustion engine for a motor vehicle. Engine 10 is equipped with a conventional electronic fuel and spark timing controller 12 that operates under the control of a microprocessor-based engine control unit (ECU) 14 based on various inputs including a knock signal (KS) generated by a knock sensor 16 mounted on engine 10. The knock sensor 16 is a piezoelectric device, and the generated knock signal is a differential AC voltage representing the vibrational signature of engine 10. In general, ECU 14 filters the knock signal KS, and the CPU 18 of ECU 14 processes the filtered knock signal to determine its amplitude at a specified knock frequency such as 6 kHz. Knock is detected if the determined amplitude exceeds a calibrated threshold, and a knock control algorithm executed by CPU 18 suppresses knock by signaling the fuel and spark timing controller 12 to retard the spark timing and/or increase the air/fuel ratio. The fuel and spark controls can be applied to all of the engine cylinders, or just the cylinder in which knock is detected.

Knock events, when present, usually occur in an interval following the top dead center (TDC) position of the combustion stroke for a given cylinder, and ECU 14 can use one knock sensor 16 to detect knock for several engine cylinders by processing the knock signal KS over specified knock detection windows coordinated with the TDC events. The duration of the knock detection window and its commencement relative to the respective TDC event are determined by calibration (CAL), and ECU 14 processes the knock signal accordingly.

The knock signal filtering and processing steps are designated in FIG. 1 by blocks 20, 22, 24 and 26. Block 22 represents an anti-alias filter (AAF); block 24 represents an analog-to-digital (A/D) converter that samples and digitizes the filtered knock signal; block 26 represents a signal processor (SP) for windowing the digital signal and determining the signal amplitude at a specified knock frequency; and block 28 represents a knock algorithm (KA) for detecting and suppressing knock. Although the knock algorithm KA is ancillary to the present invention, a possible knock detection strategy would be to detect knock when the magnitude of the knock signal at the knock frequency exceeds the sum of the most recent non-knocking magnitude and an offset value.

The anti-alias filter 20 is a low-pass filter that attenuates knock signal frequency content that exceeds the maximum knock frequency, and the sampling rate or frequency of A/D converter 22 is set at least twice as high as the maximum knock frequency. In general, increasing the sampling rate of A/D converter 22 reduces the complexity of anti-aliasing filter 20 by allowing a larger frequency roll-off margin. For example, a practical knock signal processing system can be configured with an anti-aliasing filter 20 with a cutoff frequency of 20 kHz and an A/D sampling rate of 40 kHz.

The signal processor 24 may be implemented by CPU 18 as indicated in FIG. 1, or by a dedicated digital signal processor resident within ECU 14. In either case, signal processor 24 transforms the filtered and digitized knock signal to the frequency domain over the specified knock detection window by solving a Discrete Fourier Transform (DFT) equation for the specified knock detection frequency. As described below, single-point DFT processing involves the summation of N calculated terms, where N is the number of A/D samples that occur in the knock detection window. For example, if the sampling frequency is 40 kHz and the knock detection window has a duration of 3 ms, the term N has a value of 120; i.e., solving the DFT equation involves summing 120 calculated terms. Certain coefficients of the calculated terms can be pre-calculated and stored in memory for retrieval by table-look-up, and the table data can be limited to a single 1×N array if the duration of the knock detection window does not change. For this reason, it is customary to constrain the duration of the knock detection window to a single value, even though engine control calibrators would rather have the flexibility of changing the duration.

Figure 2:
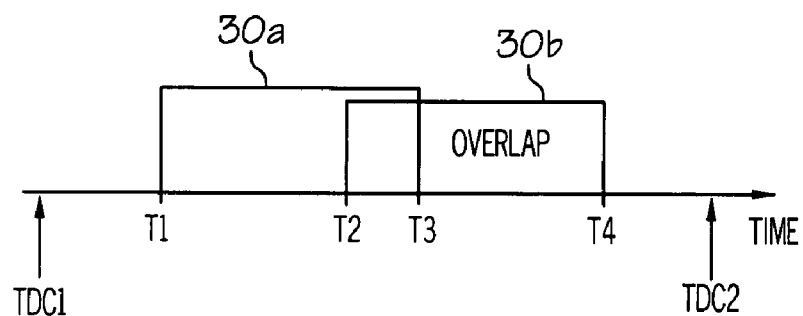
FIG. 2 is a diagram that graphically illustrates variable overlap sub-windows for knock signal processing according to this invention.

The method of the present invention overcomes the above-described difficulty by configuring the knock detection window as a pair of overlapping sub-windows of equal duration, and adjusting the amount of sub-window overlap to vary the duration of the knock detection window. The approach is illustrated graphically in FIG. 2, where the two sub-windows are designated by the reference numerals 30a and 30b. Sub-window 30a commences at time T1, a specified crank angle after the TDC event (TDC1) for the current cylinder, and has a duration of T3-T1. Sub-window 30b commences at time T2, which may be any time between times T1 and T3, and has a duration of T4-T2 (which is equivalent to T3-T1). The knock detection window duration is defined as the interval T1 to T4, and it is adjusted by adjusting the temporal overlap between sub-windows 30a and 30b. In the illustrated embodiment, for example, each sub-window has a duration of 1.5 ms, and the duration of the knock detection window is therefore adjustable between 1.5 ms (full overlap) and 3 ms (no overlap). Signal processor 24 performs the DFT calculations for each sub-window 30a, 30b using the same stored data array, and averages the results to form an output. The number of calculated terms remains the same as with a single fixed duration window because there are only 60 calculated terms per sub-window (i.e., N=60), and the memory required for pre-calculated data is halved because the same 1×N data array is used for both sub-windows 30a and 30b.

Figure 3:
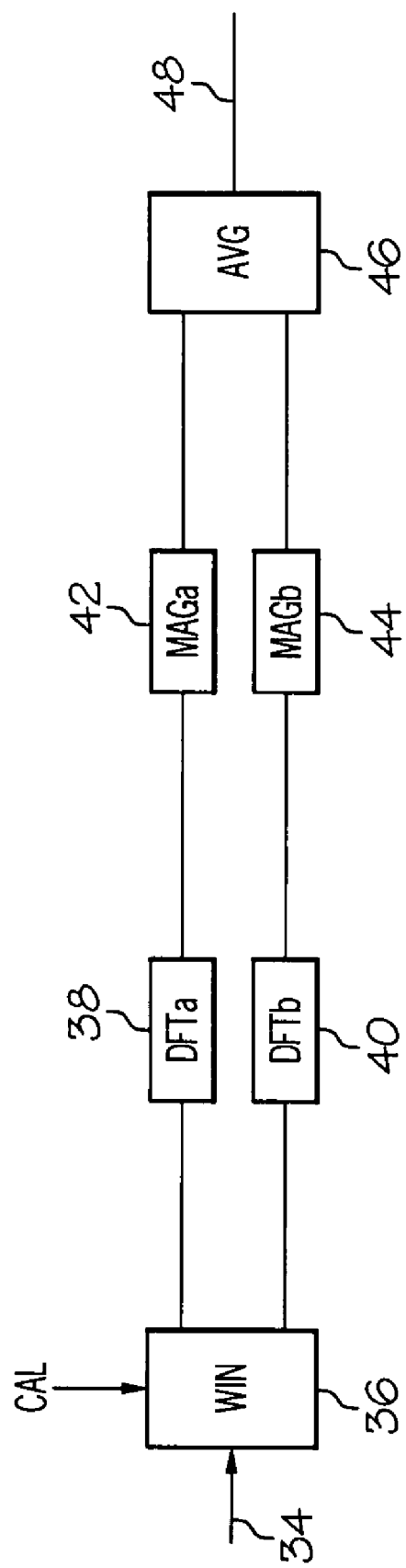
FIG. 3 is a block diagram of the signal processing method carried out by the CPU of FIG. 1.

The block diagram of FIG. 3 illustrates the method implemented by signal processor 24. Referring to FIG. 3, the digitized knock signal samples on line 34 are windowed as indicated by block 36 (WIN). The Window-Start angle and the Window-Length time are provided as calibration terms (CAL), and block 36 determines the amount of sub-window overlap required to achieve the requested Window-Length time. Given the Window-Start angle and engine speed and position information, block 36 determines times T1, T2, T3 and T4 as defined in FIG. 2, and provides a stream of knock signal samples to DFT blocks 38 and 40. Block 38 (DFTa) performs the DFT calculations for the knock signal samples that occur in sub-window 30a, and block 40 (DFTb) performs the DFT calculations for the knock signal samples that occur in sub-window 30b. For example, if the sub-windows 30a and 30b each have a duration of 3 ms, and the Window-Length time is 2.6 ms, the sub-windows 30a and 30b will overlap by 0.4 ms; this corresponds to 16 samples at a sample frequency of 40 kHz, meaning that the knock detection window would comprise only 104 samples (instead of 120 samples for a knock detection window of 3 ms). For purposes of block 36, samples 1 through 60 are supplied to block 38, and samples 45 through 104 are supplied to block 40. Block 42 (MAGa) performs a magnitude calculation for the output of block 38, and block 44 (MAGb) performs a magnitude calculation for the output of block 40. Finally, block 46 (AVG) averages the outputs of blocks 42 and 44 to form the knock magnitude output signal (line 48) that is used by the knock algorithm 26.

The DFT equation used to process the digitized knock signal samples can be given as:

$$X(e^{j\omega}) = \frac{1}{N}\sum_{k=0}^{N-1} x(k)\left(\cos\left(2\pi\frac{n}{N}k\right) - j\sin\left(2\pi\frac{n}{N}k\right)\right) \quad (1)$$

where $X(e^{j\omega})$ is a complex number representing the magnitude and phase of the knock frequency for N frequency bins (N being the number of samples per sub-window as mentioned above), $x(k)$ is the current sample value, and n is the bin number of the knock frequency. Each frequency bin has a width of $F_s/N$, where $F_s$ is the A/D sampling frequency; in the illustrated embodiment where $F_s$=40 kHz and N=60, the bin width is 667 Hz. This means that the knock frequency of 6 kHz corresponds to the ninth frequency bin of the DFT equation; i.e., n=9. These values of n and N are used to simplify equation (1) for single point (i.e., one bin) DFT processing as follows:

$$X(e^{j\omega}) = \frac{1}{60}\sum_{k=0}^{59} x(k)\left(\cos\left(2\pi\frac{9}{60}k\right) - j\sin\left(2\pi\frac{9}{60}k\right)\right) \quad (2)$$

The cosine terms for k=0 to k=59 are pre-calculated and stored as a look-up table in the memory of signal processor 24 so that in operation, the pre-calculated values can be retrieved as a function of k. The sine terms can be acquired from the same table as the cosine terms since they are simply shifted by 90 degrees.

As discussed above, the width of each DFT frequency bin is given by the ratio $F_s/N$, and the value of N is halved (from N=120 to N=60) when the knock detection window is defined as the combination of two 1.5 ms sub-windows instead of a single 3 ms window. Thus, using two sub-windows to define the knock detection window can double the DFT bin width, when compared to a single knock detection window. This is important in single point DFT-processing for knock detection because it doubles the frequency range over which the knock-related energy is detected. Moreover, the bin width does not change when the knock detection window is adjusted by changing the amount of sub-window overlap because the number N of samples per sub-window remains the same. The opposite is true in the case of a single knock detection window, where the bin width changes in inverse proportion to the length of the window.

As mentioned, the result of the DFT calculation is a complex number representing the magnitude and phase of the knock frequency. Accordingly, the result includes both real and imaginary components, which must be algebraically combined to determining the magnitude of a DFT calculation. This is achieved as follows:

$$\text{Magnitude} = \sqrt{REAL^2 + IMAG^2} \quad (3)$$

As indicated by blocks 42 and 44 of FIG. 3, the magnitude calculation is performed separately for the DFT results for sub-windows 30*a* and 30*b*, and the two magnitudes are arithmetically averaged by block 46.

In summary, the method of the present invention provides an efficient way of improving knock detection flexibility with single-point DFT processing by implementing the knock detection window as a pair of identical-duration sub-windows with adjustable overlap. While the invention has been described with respect to the illustrated embodiment, it is recognized that numerous modifications and variations in addition to those mentioned herein will occur to those skilled in the art. For example, the duration of the knock window may be changed either statically as suggested above, or dynamically in response to engine operating conditions. Also, the number of knock sensors, knock detection frequencies, and knock detection sub-windows may be different than shown, the knock detection magnitudes for the sub-windows may be weighted before averaging, and so on. Additionally, it may be desirable to impress an apodization (i.e., tapering) function on the filtered knock signal or the pre-calculated data array in order to minimize distortion introduced by the sub-window transitions. Accordingly, it is intended that the invention not be limited to the disclosed embodiment, but that it have the full scope permitted by the language of the following claims.

The invention claimed is:

1. A method of processing a knock signal produced by an engine knock sensor to determine a magnitude of the knock signal at a specified knock frequency for knock detection, comprising the steps of:

anti-alias filtering the knock signal to pass a range of knock signal frequencies including the specified knock frequency;

sampling and digitizing the filtered knock signal to form a series digital samples for DFT-processing;

characterizing a specified knock detection interval as a combination of at least first and second processing windows of fixed and identical duration with a variable amount of overlap;

DFT-processing said digital samples over said first processing window to form a first knock signal magnitude, and DFT-processing said digital samples over said second processing window to form a second knock signal magnitude; and combining said first and second knock signal magnitudes to form the knock signal magnitude for knock detection.

2. The method of claim 1, including the step of:

determining an overlap of said first and second processing windows so that their combined duration corresponds to the specified knock detection interval.

3. The method of claim 1, including the steps of:

storing an array of pre-calculated terms for use in DFT-processing said digital samples; and retrieving the stored pre-calculated terms for DFT-processing the digital samples over both first and second processing windows.

4. The method of claim 1, including the step of:

averaging said first and second knock signal magnitudes to form the knock signal magnitude for knock detection.

\* \* \* \* \*